US008244896B2

(12) United States Patent
Woodward et al.

(10) Patent No.: US 8,244,896 B2
(45) Date of Patent: Aug. 14, 2012

(54) METHOD, APPARATUS AND PROGRAM PRODUCT FOR MEDIA IDENTIFICATION AND TRACKING ASSOCIATED USER PREFERENCES

(75) Inventors: Mark L. Woodward, Milton, MA (US); E. Oliver Jones, Andover, MA (US); Gene S. Fein, Lenox, MA (US); Christopher Harris, Amherst, MA (US); Steve S. Sherman, Boston, MA (US); Bennie Jones, Methuen, MA (US); Anthony Salotto, Norton, MA (US)

(73) Assignee: Emission Limited Liability Company, Wilmington, DE (US)

( * ) Notice: Subject to any disclaimer, the term of this patent is extended or adjusted under 35 U.S.C. 154(b) by 983 days.

(21) Appl. No.: 11/892,015

(22) Filed: Aug. 17, 2007
(Under 37 CFR 1.47)

(65) Prior Publication Data

US 2008/0147715 A1 Jun. 19, 2008

Related U.S. Application Data

(62) Division of application No. 11/445,025, filed on Jun. 1, 2006, now Pat. No. 7,844,722, which is a division of application No. 10/142,731, filed on May 8, 2002, now Pat. No. 7,085,845.

(60) Provisional application No. 60/289,768, filed on May 9, 2001, provisional application No. 60/289,772, filed on May 9, 2001.

(51) Int. Cl.
*G06F 15/16* (2006.01)
(52) U.S. Cl. ......... 709/231; 709/203; 709/218; 709/230
(58) Field of Classification Search .......... 709/202–207, 709/236–238, 231, 218, 224
See application file for complete search history.

(56) References Cited

U.S. PATENT DOCUMENTS 5,485,518 A   1/1996   Hunter et al.
(Continued)

FOREIGN PATENT DOCUMENTS

CN   101465840 A   6/2009
(Continued)

OTHER PUBLICATIONS

Non-Final Office Action for U.S. Appl. No. 10/143,729, mailed Nov. 10, 2008, 21 pgs.
(Continued)

*Primary Examiner* — Asad M Nawaz
*Assistant Examiner* — Sargon Nano
(74) *Attorney, Agent, or Firm* — Sterne, Kessler, Goldstein & Fox PLLC

(57) ABSTRACT

Collecting user preference information related to a playing media recording is accomplished by gathering descriptive information related to the playing media recording from a media player program presenting the playing media recording and determining if tags are embedded in the media recording and gathering descriptive information related to the playing media recording from the tags embedded in the playing media recording, if the tags exist. Further, determining if a table of contents exists on the media recording and gathering a table of contents for a collection containing the playing media recording by identifying the collection using a concatenation of track lengths identifier generation technique, the table of contents exists. Then assembling the descriptive information into a media recording information packet and sending the media recording information packet to a server computer, resulting in a collection of user preference information related to the playing media recording.

20 Claims, 3 Drawing Sheets

U.S. PATENT DOCUMENTS

| | | | |
|---|---|---|---|
| 5,572,643 | A | 11/1996 | Judson |
| 5,640,193 | A | 6/1997 | Wellner |
| 5,721,827 | A | 2/1998 | Logan et al. |
| 5,745,678 | A | 4/1998 | Herzberg et al. |
| 5,749,081 | A | 5/1998 | Whiteis |
| 5,761,606 | A | 6/1998 | Wolzien |
| 5,761,662 | A | 6/1998 | Dasan |
| 5,774,664 | A | 6/1998 | Hidary et al. |
| 5,778,181 | A | 7/1998 | Hidary et al. |
| 5,809,512 | A | 9/1998 | Kato |
| 5,892,825 | A | 4/1999 | Mages et al. |
| 5,913,204 | A | 6/1999 | Kelly |
| 5,915,243 | A | 6/1999 | Smolen |
| 5,931,906 | A | 8/1999 | Fidelibus, Jr. et al. |
| 5,933,811 | A | 8/1999 | Angles et al. |
| 5,937,392 | A | 8/1999 | Alberts |
| 5,945,988 | A | 8/1999 | Williams et al. |
| 5,963,916 | A | 10/1999 | Kaplan |
| 5,987,509 | A | 11/1999 | Portuesi |
| 5,987,525 | A | 11/1999 | Roberts et al. |
| 5,991,798 | A | 11/1999 | Ozaki et al. |
| 6,047,292 | A | 4/2000 | Kelly et al. |
| 6,061,680 | A | 5/2000 | Scherf et al. |
| 6,106,399 | A * | 8/2000 | Baker et al. ............ 463/42 |
| 6,118,450 | A | 9/2000 | Proehl et al. |
| 6,138,155 | A | 10/2000 | Davis et al. |
| 6,154,773 | A | 11/2000 | Roberts et al. |
| 6,195,693 | B1 | 2/2001 | Berry et al. |
| 6,205,432 | B1 | 3/2001 | Gabbard et al. |
| 6,216,129 | B1 | 4/2001 | Eldering |
| 6,256,633 | B1 | 7/2001 | Dharap |
| 6,285,985 | B1 | 9/2001 | Horstmann |
| 6,298,332 | B1 | 10/2001 | Montague |
| 6,298,348 | B1 | 10/2001 | Eldering |
| 6,321,221 | B1 | 11/2001 | Bieganski |
| 6,330,593 | B1 * | 12/2001 | Roberts et al. ............ 709/217 |
| 6,429,879 | B1 | 8/2002 | Sturgeon et al. |
| 6,502,213 | B1 | 12/2002 | Bowman-Amuah |
| 6,539,395 | B1 | 3/2003 | Gjerdingen et al. |
| 6,609,096 | B1 | 8/2003 | De Bonet et al. |
| 6,670,537 | B2 | 12/2003 | Hughes et al. |
| 6,829,368 | B2 | 12/2004 | Meyer et al. |
| 6,925,469 | B2 | 8/2005 | Headings et al. |
| 6,947,922 | B1 * | 9/2005 | Glance ............ 705/26.1 |
| 6,985,694 | B1 | 1/2006 | DeBonet et al. |
| 7,031,931 | B1 | 4/2006 | Meyers |
| 7,032,178 | B1 | 4/2006 | McKnight et al. |
| 7,035,871 | B2 | 4/2006 | Hunt et al. |
| 7,085,303 | B2 | 8/2006 | Hunt |
| 7,085,845 | B2 | 8/2006 | Woodward et al. |
| 7,171,018 | B2 | 1/2007 | Rhoads et al. |
| 7,206,748 | B1 | 4/2007 | Gruse et al. |
| 7,406,436 | B1 * | 7/2008 | Reisman ............ 705/10 |
| 7,447,791 | B2 | 11/2008 | Leaning et al. |
| 7,447,907 | B2 | 11/2008 | Hart et al. |
| 7,505,605 | B2 | 3/2009 | Rhoads et al. |
| 7,756,892 | B2 | 7/2010 | Levy |
| 7,844,722 | B2 | 11/2010 | Woodward et al. |
| 2001/0034219 | A1 | 10/2001 | Hewitt et al. |
| 2001/0037465 | A1 | 11/2001 | Hart et al. |
| 2002/0003886 | A1 | 1/2002 | Hillegass et al. |
| 2002/0010621 | A1 | 1/2002 | Bell et al. |
| 2002/0078056 | A1 | 6/2002 | Hunt et al. |
| 2002/0082901 | A1 * | 6/2002 | Dunning et al. ............ 705/10 |
| 2002/0123924 | A1 | 9/2002 | Cruz |
| 2002/0124252 | A1 | 9/2002 | Schaefer et al. |
| 2002/0143565 | A1 | 10/2002 | Headings et al. |
| 2002/0184339 | A1 * | 12/2002 | Mackintosh et al. ......... 709/218 |
| 2002/0188746 | A1 * | 12/2002 | Drosset et al. ............ 709/231 |
| 2003/0012403 | A1 | 1/2003 | Rhoads et al. |
| 2003/0023975 | A1 | 1/2003 | Schrader et al. |
| 2003/0033385 | A1 * | 2/2003 | Yavitz ............ 709/219 |
| 2003/0079015 | A1 | 4/2003 | Fein et al. |
| 2003/0195795 | A1 | 10/2003 | Chacker |
| 2003/0229537 | A1 * | 12/2003 | Dunning et al. ............ 705/10 |
| 2004/0107356 | A1 | 6/2004 | Shamoon et al. |
| 2004/0116088 | A1 * | 6/2004 | Ellis et al. ............ 455/132 |
| 2004/0215741 | A1 | 10/2004 | Watson |
| 2005/0021729 | A1 * | 1/2005 | Yoshida ............ 709/223 |
| 2005/0050577 | A1 | 3/2005 | Westbrook et al. |
| 2005/0055420 | A1 | 3/2005 | Wyler |
| 2005/0058319 | A1 | 3/2005 | Rhoads et al. |
| 2005/0097008 | A1 | 5/2005 | Ehring et al. |
| 2006/0080083 | A1 | 4/2006 | Lin et al. |
| 2006/0129933 | A1 | 6/2006 | Land et al. |
| 2006/0178918 | A1 | 8/2006 | Mikurak |
| 2006/0218292 | A1 | 9/2006 | Woodward et al. |
| 2006/0253585 | A1 | 11/2006 | Fein et al. |
| 2008/0134242 | A1 | 6/2008 | Klosterman |
| 2008/0147715 | A1 | 6/2008 | Woodward et al. |
| 2008/0172747 | A1 | 7/2008 | Hurtado et al. |
| 2009/0049303 | A1 | 2/2009 | Hart et al. |
| 2009/0070438 | A1 | 3/2009 | Bartholomew |
| 2009/0245539 | A1 * | 10/2009 | Vaudrey et al. ............ 381/109 |
| 2010/0008586 | A1 * | 1/2010 | Meyer et al. ............ 382/190 |

FOREIGN PATENT DOCUMENTS

| | | | |
|---|---|---|---|
| JP | 2001/142711 A | | 5/2001 |
| WO | WO 01/04777 A2 | | 1/2001 |

OTHER PUBLICATIONS

Non-Final Office Action for U.S. Appl. No. 10/143,729, mailed Jun. 28, 2007, 11 pgs.
Non-Final Office Action for U.S. Appl. No. 10/143,729, mailed Aug. 10, 2006, 8 pgs.
Non-Final Office Action for U.S. Appl. No. 10/143,729, mailed Jun. 23, 2005, 6 pgs.
Final Office Action for U.S. Appl. No. 10/143,729, mailed Apr. 30, 2008, 9 pgs.
Final Office Action for U.S. Appl. No. 10/143,729, mailed Feb. 9, 2007, 12 pgs.
Final Office Action for U.S. Appl. No. 10/143,729, mailed Jan. 10, 2006, 7 pgs.
Non-Final Office Action for U.S. Appl. No. 11/485,237, mailed Oct. 20, 2008, 6 pgs.
Non-Final Office Action for U.S. Appl. No. 11/485,237, mailed Apr. 4, 2007, 5 pgs.
Final Office Action for U.S. Appl. No. 11/485,237, mailed Dec. 14, 2007, 6 pgs.
Non-Final Office Action for U.S. Appl. No. 10/142,731, mailed Jul. 25, 2005, 8 pgs.
Non-Final Office Action for U.S. Appl. No. 11/485,237, mailed Mar. 25, 2009, 6 pgs.
"Generating Unique ids for Audio cds," http://www.hinzen.de/cdplayer/samples/sample01.html, last uploaded Mar. 22, 2005.
"How to: Get or Create a Unique Audio CD Volume Label," http://support.microsoft.com/kb/q147654/, last reviewed Jul. 1, 2004.
Adamec, T.M., "Recognizing an Audio CD," http://www.vbonline.com/vb-mag/9612/audio/default.html, last printed Jun. 27, 2001.
Philips, Lawrence, "The Double Metaphone Search Algorithm," C/C++ Users Journal, vol. 18., No. 6, pp. 38-43 (2000).
"Cd player.ini questions and answers," http://web.archive.org/web/20000818005412/www.hinzen.de./cdplayer/q-and-a- .html, Aug. 2000.
"Portable Network Graphics," printed from internet website: http://web.archive.org/web/20010207200324/www.libpng.org/pub/png/, Feb. 2001.
"ID3v2: Tagging of MPEG Layer 3 tags," printed from internet website: http://web.archive.org/web/20010330043006/http://www.id3v2.org/ , Mar. 2001.
"Muze Music Online Data Dictionary," printed from internet website: http://web.archive.org/web/20010412164802/http://muze.com/print.html#Phonolog, Apr. 2001.
"A Massively Spiffy Yet Delicately Unobtrusive Compression Library," printed from internet website: http://web.archive.org/web/20010413102952/www.freesoftware.com/pub/infozi- p/zlib/, Apr. 2001.
"CD Table of Contents," http://www.disctronics.co.uk, 2001.
Binstock & Rex, "Metaphone Algorithm", Practical Algorithms for Programmers, Addison Wesley, 1995.
Sherf, Steve, "The Internet CD Database Server", http://ftp.freedb.org/pub/freedb/latest/README, 1996.

Non-Final Office Action for U.S. Appl. No. 11/445,025, mailed Jul. 2, 2007, 7 pgs.
Final Office Action for U.S. Appl. No. 11/445,025, mailed Oct. 6, 2008, 8 pgs.
Non-Final Office Action for U.S. Appl. No. 11/445,025, mailed Apr. 13, 2009, 11 pgs.
Final Office Action for U.S. Appl. No. 11/445,025, mailed Sep. 24, 2009, 14 pgs.
Notice of Allowance for U.S. Appl. No. 11/445,025, mailed Aug. 5, 2010, 4 pgs.

Non-Final Office Action for U.S. Appl. No. 11/445,025, mailed Feb. 19, 2010, 14 pgs.
Final Office Action for U.S. Appl. No. 10/143,729, mailed Apr. 28, 2009, 7 pgs.
English language abstract for Japanese Appln. No. 2001/142711, filed May 25, 2001, 1 pg.
English language abstract for Chinese Appln. No. 101465840, filed Jun. 24, 2009, 1 pg.

* cited by examiner

METHOD, APPARATUS AND PROGRAM PRODUCT FOR MEDIA IDENTIFICATION AND TRACKING ASSOCIATED USER PREFERENCES

RELATED APPLICATION(S)

This application is a divisional of U.S. patent application Ser. No. 11/445,025 (now U.S. Pat. No. 7,844,722), filed Jun. 1, 2006, which is a divisional of U.S. patent application Ser. No. 10/142,731 (now U.S. Pat. No. 7,085,845), filed on May 8, 2002, which claims the benefit of U.S. Provisional Application No. 60/289,768, filed on May 9, 2001 and U.S. Provisional Application No. 60/289,772, filed on May 9, 2001. The entire teachings of the above applications are incorporated herein by reference.

BACKGROUND OF THE INVENTION

This invention relates generally to tracking user preferences, and more specifically to acquiring user preference data relating to media recordings.

SUMMARY OF THE INVENTION

Collecting user preference information related to a playing media recording is accomplished by gathering descriptive information related to the playing media recording from a media player program presenting the playing media recording and determining if tags are embedded in the media recording and gathering descriptive information related to the playing media recording from the tags embedded in the playing media recording, if the tags exist. Further, the invention determines if a table of contents exists on the media recording, or gathers table of contents information for a collection containing the playing media recording by identifying the collection using a technique that concatenates track lengths to generate an identifier. Next, the invention method and apparatus assembles the descriptive information into a media recording information packet and sends the media recording information packet to a server computer, resulting in a collection of user preference information related to the playing media recording.

In an embodiment of the present invention the descriptive information comprises a user identifier; at least one of: a name of the playing media recording, a name of a collection containing the playing media recording, a name of an artist performing the playing media recording; and a sequence number of the playing media recording within the collection. Additionally, tags can be MPEG Layer 3 tags.

The present invention records a subject user's audio listening history by receiving a media recording information packet from a client computer and cross-referencing the media recording information packet with a media recording description database and returning a unique serial number for the entry in the media recording description database. A user identifier is recorded together with the unique serial number into a user preference database, such that the user preference database provides the subject user's media listening history.

Cross-referencing may include identifying an exact match in the media recording description database for a non-empty element in the media recording information packet. Cross-referencing may also include identifying a match in the media recording description database using a fuzzy-logic algorithm and determining the match based upon a highest probability computed. Cross-referencing may further include identifying an associated domain-specific element in the media recording description database for a non-empty element in the media recording information packet. Cross-referencing may further include identifying a metaphone-associated element in the media recording description database for a non-empty element in the media recording information packet.

The present invention identifies users listed in the user preference database as those who listen to the same media recording, as identified by the same unique serial number, as that listened to by the subject user. Identified users can be sent a message. The identified users can be sent a message while they are listening to the same media recording. User's preferences are inferred based upon analysis of the user's audio listening history or directly solicited from the a user. Preference may include: specific media recording, collection, artist or genre. Users with similar preferences based upon analyzing the user preference database can be identified and introduced to each other.

A user community can be created by transferring information from the user preference database into an automated collaborative filtering engine to generate a list of users having similar preferences. Lists of preferred media recordings of the user community can be created. Identified users can message each other based upon being identified as having a particular user preference for the media recording.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. In support of creating an online music community service, the present invention utilizes a unique combination of technologies. The first aspect of the present invention is implemented as client program, made available to the general public free of charge for downloading from the Internet. The second aspect is a database system and server program. The downloadable program products running on behalf of many different users simultaneously, and the server software, work together to create an online experience for users which identifies fans of the same and similar music to each other creating a dynamic collection of online communities.

Figure 1:
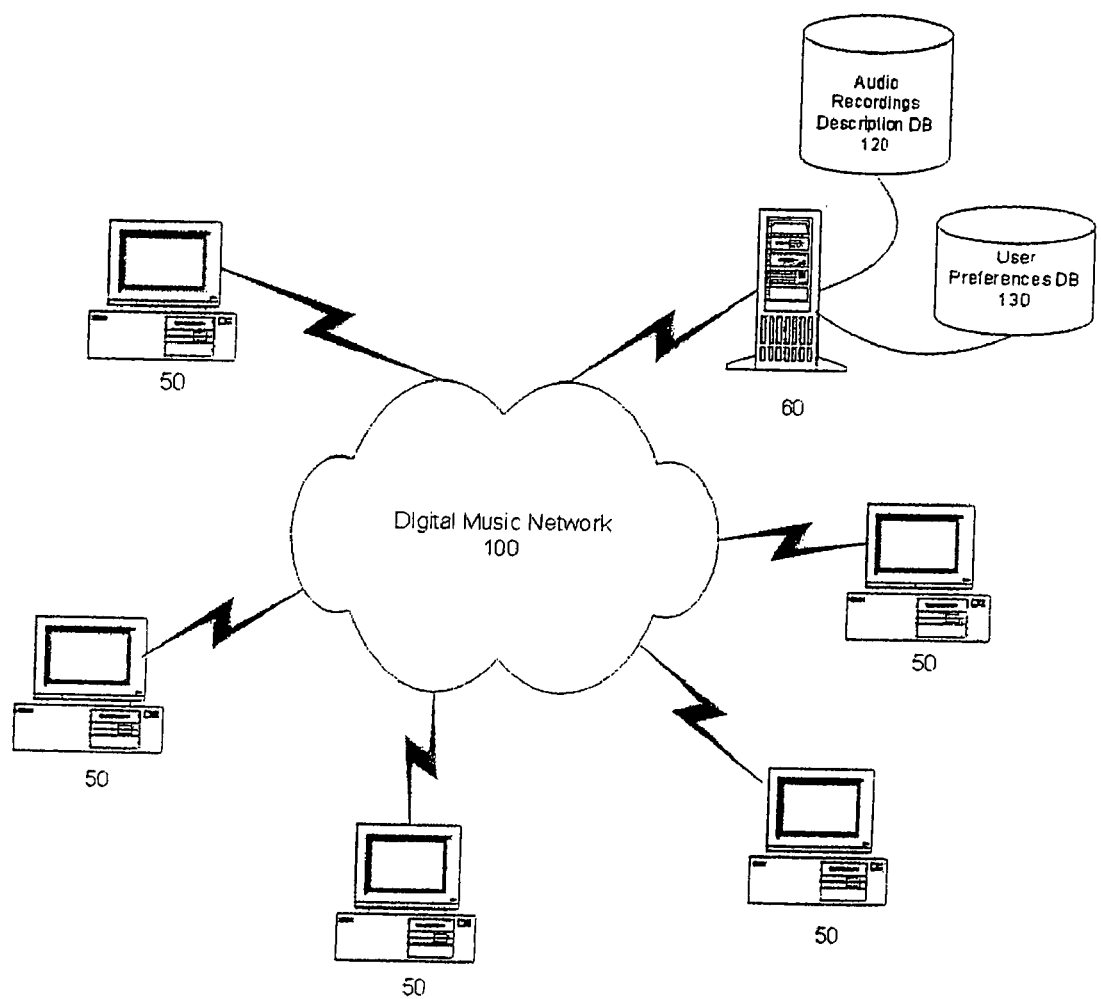
FIG. 1 illustrates a digital music network on which an embodiment of the present invention is implemented.

FIG. 1 is a diagram of a computer system on which an embodiment of the present invention is implemented. Client computer 50 provides processing, storage, and input/output devices playing recorded media. The client computers 50 can also be linked through a digital music network 100 to other computing devices, including other client computers 50 and server computers 60. The digital music network 100 can be part of the Internet, a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In one embodiment of the present invention, user preference information is collected and recorded in a user preferences database 130. Additionally, audio listening history is collected and recorded in an audio recordings description database 120.

Figure 2:
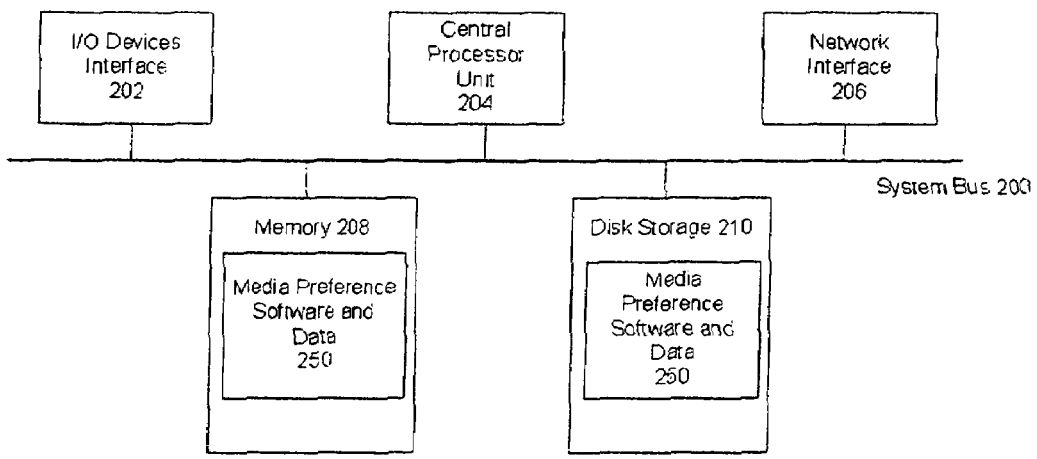
FIG. 2 is a diagram of the internal structure of a node on the digital music network of FIG. 1 configured according to an embodiment of the present invention.

FIG. 2 is a diagram of the internal structure of a computer (e.g., 50, 60) in the computer system of FIG. 1. Each computer contains a system bus 200, where a bus is a set of hardware lines used for data transfer among the components of a computer. A bus 200 is essentially a shared conduit that connects different elements of a computer system (e.g., processor, disk storage, memory, input/output ports, network ports, etc.) that enables the transfer of information between the elements. Attached to system bus 200 is an I/O device interface 202 for connecting various input and output devices (e.g., displays, printers, speakers, etc.) to the computer. A network interface 206 allows the computer to connect to various other devices attached to a network (e.g., network 70). A memory 208 provides volatile storage for computer software instructions (e.g., media preference software 250) and data structures (e.g., user preferences database 130 and audio recordings description database 120) used to implement an embodiment of the present invention. Disk storage 210 provides non-volatile storage for computer software instructions (e.g., media preference software 250) and data structures (e.g., user preferences database 130 and audio recordings description database 120) used to implement an embodiment of the present invention. A central processor unit 204 is also attached to the system bus 200 and provides for the execution of computer instructions (e.g., media preference software 250), thus allowing for the collection of user preference information and audio listening history information to provide a digital music network.

Figure 3:
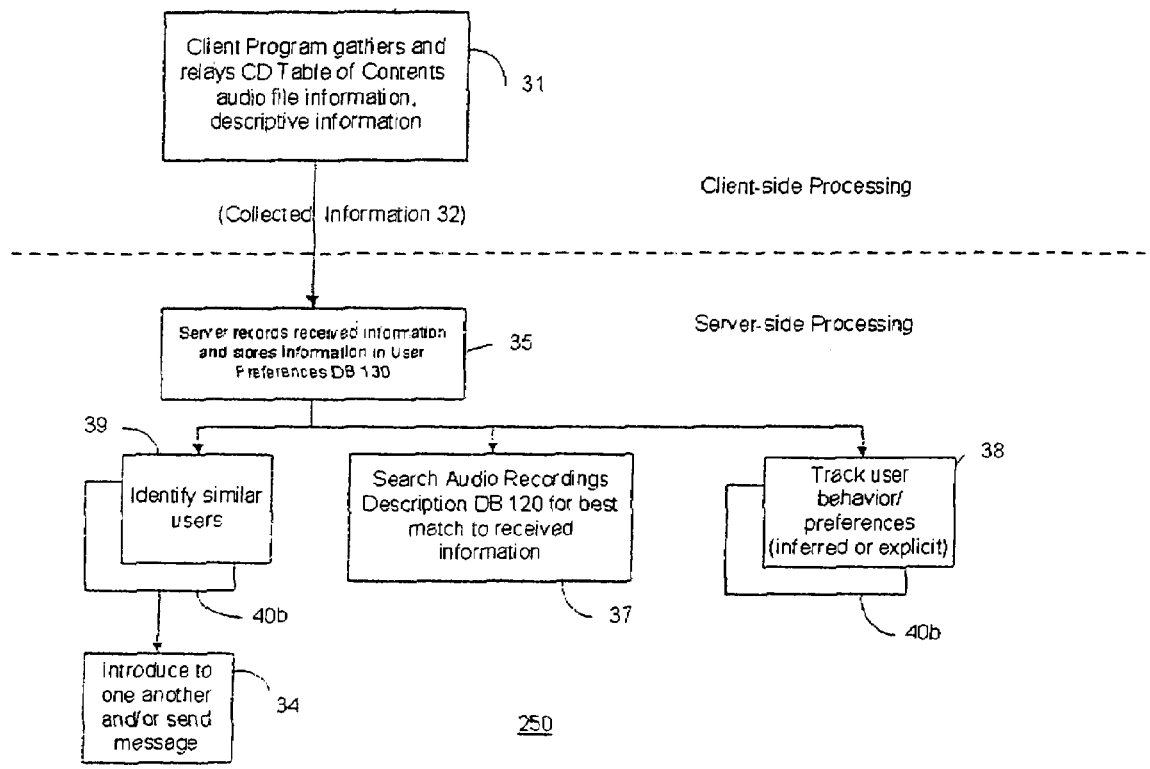
FIG. 3 is a flow diagram showing client-side processing and server-side processing in the embodiment of FIG. 1 and FIG. 2.

The present invention client program, when installed on a multimedia-capable personal computer, interacts with the server software and data base system to provide the following functions as illustrated in FIG. 3.

Plug-in technology is used to sense activity. The present invention client program uses plug-in technology to sense activity in a wide variety of other program products from various sources called Media Players. These Media Player program products are used to play recorded sounds—usually prerecorded music—through the PC's speakers to the user of the PC. Media Players include Winamp, the Real Player, the Microsoft Media Player, Lycos's Sonique player, and others. Each distinct player has activity sensed by a software component compatible both with the present invention client program and the particular player. Those skilled in the art of programming for personal computers with Microsoft Windows will appreciate that it is straightforward to develop and test such software components, known as dynamic link libraries or DLLs. Those skilled in the art will also appreciate that some media player vendors publish specifications for the development of plug-in components, and others do not. The plug-in component for each player senses when a new piece of music, sound file, or track begins to play, and relays whatever information it can determine about the music, track, or sound file being played. Specifically when players play music, they ordinarily display information about that music, such as the name of the artist, the name of the album, the name of the track or song, and the number of the track or song being played. They may also display the year the music was published, a genre (such as "funk," "classical," or "jazz"). In one embodiment the present invention client program is implemented as a plugin that gathers and relays whichever of these displayed items of data it has available (Step 31, FIG. 3).

CD Table of Contents sensing is a component of the present invention. It senses the insertion of a compact disc into the compact disc player of a personal computer. Using the retrieval techniques, it retrieves descriptive information for the CD as a whole, and for the individual tracks of the CD, from a server on the Internet. It then transmits that information (Step 31 of FIG. 3 is illustrative).

Audio file information retrieval is performed when a plugin (as described above) detects that a media player is playing an audio file, commonly a file in MPEG Layer 3 sound format (commonly known as MP3). A component 31 of the present invention client program looks for and retrieves descriptive information from within the sound file. The means for storing and retrieving such information from sound files is well known in the art. Those skilled in the art will appreciate that this sought and/or retrieved information may be present or absent, may be complete or incomplete, and may be correct, misspelled, or just plain wrong.

Assembly of information from various sources is performed within the present invention client program. A collection of (i) descriptive information about each track, coming from various sources including the player, (ii) CD contents data, (iii) type of media (compact disc, audio file, etc) and (iv) audio file tag data is assembled. Each item in the collection of information may be absent, present, or present from multiple sources. It may be complete or incomplete, and it may be wrong or right.

Collected information from the present invention client program product is relayed to the present invention server as shown at 32 in FIG. 3. The information, in the state gathered by the present invention client program as shown at 31 in FIG. 3, is transmitted to a present invention server program containing a server software package and database system. The server software makes a record of this information as shown at 35 in FIG. 3.

A lookup of a particular song is performed on the server software package using the collected information to locate the best match—the most likely song—within a database 120 structured as a sequence of records for each published compact disc or other music collection and another sequence of records for each published track (song) within the published compact discs or other music collections. The sequences of records for published compact discs are furnished by a commercial data service, and are augmented by sequences of records for other collections not made available on compact disc. The present invention server program assigns a unique serial number to each compact disc or collection, and another unique serial number to each track or song occurring within any collection. The lookup process retrieves, if possible, the unique CD serial number and the unique track serial number of the best possible matching item.

The search process 37 first looks for an exact match in each data item (performer, collection title, track title, track number, and publication year) between the data base and the information about the particular song relayed from the present invention client program. Finding a match, it yields the appropriate serial numbers. If an exact match is not found, the database system and server software performs a match using commonly known text-search techniques such as preposition removal, case-insensitive matching and number spelling. Those skilled in the art will appreciate that such techniques must be used in domain-specific ways, correctly to handle cases such as, for example, the rock-and-roll act called "The The". Finding a match in this way, the software yields appropriate serial numbers. If a match is still not found, the database system 120 and server software attempts to perform a match using sound-alike techniques as taught (e.g., metaphone and double metaphone search algorithms). As persons skilled in the art will appreciate, such techniques ordinarily yield multiple ambiguous matches, so the server software applies rules to determine the probability of correctness of each match, and chooses the most probable. If a particular match has a distinguished high probability, appropriate serial numbers are yielded. If the data base server matches tracks that appear on multiple compact discs or other collections, and cannot differentiate which compact disc or other collection the track might appear on, it removes the ambiguity by choosing the compact disc or collection with the earliest date of publication. Notice that if one user of the present invention plays a sound file of "Every Breath You Take" by The Police, and another plays the same song on a compact disc, the present invention database and server software will yield the same serial number for both cases.

The present invention records current user behavior. The searched serial numbers, and the data items gathered by the present invention server software 37, are stored in a data base system 130 in a form suitable for the applications described in the following paragraphs.

The present invention server software searches, using the serial numbers, for all the users of the present invention client program at a point in time playing the same music, and using Web information display techniques, identifies 39 and introduces 34 these users to one another, so that they may interact with each other. This is possible because all the users' program products report to a centrally organized server on the Internet.

The unique matched serial number codes are used to detect behavioral actions and infer user preferences 38. If a user plays a particular track on a compact disc frequently, it is valid to infer that the user likes the music on that track. If a user plays a particular sound file frequently, it is also valid to infer that the user likes the music on that sound file. However, it is also valid to infer that the user who possesses a physical compact disc or other media has a somewhat stronger preference for the music. The present invention server software system (at 38) keeps track of repeated behavior by each user, and infers users preferences from that repeated behavior.

The present invention also solicits explicit user preferences. Using World-wide-web information systems techniques well known to those skilled in the art, such as HTML forms, the present invention client program solicits its users explicitly to identify their preferences for particular music tracks. The present invention server product 38 then records those explicit preferences, discontinuing the use of inferred preferences for the particular tracks the user gave ratings for.

The present invention server software searches, using the serial numbers, for all the users who have rated the same music highly, and using Web information display techniques, identifies 39 and introduces 34 these users to one another, so that they may interact with each other.

The present invention server software at 40*a,b* forms clusters of users with similar tastes using Automated Collaborative Filtering (ACF) technology furnished by NetPerceptions, Inc., and based on user preferences both inferred from user behavior and explicit. Automated Collaborative Filtering, in general, uses accumulated rating data furnished by a large number users to determine which users are likely to have similar tastes. For example, many different users might each rate a hundred or so movies from a collection of several thousand, specifying how much they like each movie on a scale of 1 (hate it) to 5 (love it). Once this ratings data is in place, such a typical ACF application would present each user with recommendations of other movies they might like, based on a comparison of that user's preferences with other users.

The present invention exploits this ACF technology in an innovative fashion by entering ratings into the system 40*a,b* based on the behavioral detection of user preference 38. This sort of innovation is important because it ensures that larger numbers of ratings, and more accurate ratings, go into the ACF system 40*a,b*, which yields more accurate and interesting recommendations.

The present invention server software is capable of delivering messages—termed "Alerts" within a system employing the present invention—to end users. These messages are delivered to a user after the present invention server software records current user behavior. The choice of which users should see each message is based upon the users' individual behavior. The timing of message delivery is based upon the user's behavior in real time—that is, the message can be delivered precisely when the user chooses to listen to particular music.

A music identification subsystem of the present invention determines which piece of music is being played by a particular client. A piece of music is characterized by particular artist, title, and song. The present invention client program reports what's playing by passing in several different kinds of parameters. The client program gleans these parameters from the music player and/or the MP3 file tags. In some cases, these parameters may be complete, well-formed, and spelled correctly. In other cases the parameters may be misspelled or incomplete. In the worst case the player may report back nothing but a CD hash code or a MP3 file pathname.

The music identification subsystem takes the parameters, looks them up, and reports back the three identifying items: the artist, title and song being played. The identifiers point out the particular artist, title, or work uniquely within the set of known artists, titles, and works.

The music identification subsystem can be implemented in a way which allows several web server instances running on each of several machines to access it. It is acceptable to implement the system in a replicated fashion, with the same code running on each of several servers, or as a single server.

In one embodiment, the web servers are Apache 1.3.12, with mod_php 4.0.0 built in. They run on Linux (Red Hat 6.1/Intel, kernel 2.2.12, glibc 2.1). The development environment is that provided with Red Hat 6.1. Additionally, an Oracle 8i data base version 8.1.5 is employed, running on Solaris 2.7/SPARC. The music ID subsystem could be implemented to run on Linux servers, with a view towards porting it easily to run on Solaris.

Each piece of music is identified with three codes: the artist, title, and song being played. The first identifier is the title of the CD from which the music comes. The present invention uses a code (the domain DOT_TITLE in our data dictionary) to identify this title. Most of our DOT_TITLE unique identifiers are the same as Muze Numbers (MUZENBR, see www.muze.com), although DOT_TITLE codes are assigned to titles which aren't cataloged by Muze. Another identifier is the artist responsible for the CD. In the case of most popular music, the CD is identified by a single artist. The present invention uses a code (the domain DOT_ARTIST in our data dictionary) to uniquely identify an artist. Most of the values of this code relate directly to the PERFORMER2 column from MUZENBR. Again, the present invention can assign codes for artists which aren't cataloged by Muze. The third identifier is the song (or track) for the music. The present invention uses a code (the domain DOT_TRACK in our data dictionary) to identify the individual track being played. This identifier is constructed by appending the disc number and track number to the appropriate DOT_TITLE code for the track. The DOT_TRACK uniquely identifies a song being played. In the Muze database, each title has an associated genre and sub-genre.

The information sent from the player may be ambiguous in the way it identifies tracks. Our music identification system does its best to find a "canonical" track for each batch of track information sent from a client. For example, consider these three sets of track information:

Grateful Dead "Sugar Magnolia" American Beauty, 1969 4:10

Grateful Dead "Sugar Magnolia (Jam) Orpheum" bootleg, 1994, 34:20

Greateful Dead "Sugar Megnolia" American Beauty

The first of these is a track from a CD. The second is a recording made by a fan at a concert and put on an MP3 file. No record exists in the title database for this specific recording. In this case, the closest match for the second item in the data base may be the first item. The third item illustrates misspellings. In this case the closest match is also the first item.

The DOT_TRACK, DOT_TITLE, and DOT_ARTIST codes must remain permanently unchanging, as they will be used to record user activity and preferences throughout the system. The MUZENBRs from which the DOT_TITLE and DOT_TRACK codes are derived are permanently assigned. The present invention assigns the DOT_ARTIST code, and must make it a permanent assignment.

The music ID system, externally, offers three basic functions, and some extra service functions. The basic functions are these:

song=lookup_song (<input parameters>)

title=lookup_title (<input parameters>)

artist=lookup_artist (<input parameters>)

Because of the structure of the reference database used, the song's identity (the DOT_TRACK) also identifies the artist and title. However, for our purposes it makes sense sometimes to look up just the title or just the artist. In some situations, including misspellings in the input parameters, we may be able to search the data base 120 in a way which would yield an ambiguous result if we were searching for the precise song, but an unambiguous result if we were searching just for the artist who created the song.

Each of these basic functions starts with the input parameters offered by the Present invention client. Each function matches those parameters to the music data base 120 and returns the single most likely choice of song, title, or artist. The music ID system also offers some simple service functions to navigate the artist/title/song hierarchy.

title=get_title_from_song (song)

artist=get_artist_from_song (song)

artist=get_artist_from_title (title)

Finally, the music ID system offers some simple service functions to retrieve genre information from the data base 120. Genre information, both general and specific, is provided for each title in our data base.

genre=get_genre (song)

genre=get_genre (title)

The basic music identification process flow must take into consideration many situations while attempting to identify MP3 files. It is acknowledged that the identification may not always be perfect. The following is a description of a music identification process flow for identifying MP3 files according to an embodiment of the present invention.

Transmit the contents of the MP3 file's ID3 tag to the server, if an ID3 tag is available and populated with information. Most MP3 files have at least some information in the ID3 tag. This information is put there by the "ripper"—the program which created the MP3 file from the CD. In many cases the ripper fetched that information from the CDDB version 1 data base. In other cases the user of the ripper keyed in the information. ID3 tags are often lost or incomplete (e.g., Napster often truncates files, and the ID3 tags are at the ends of the files).

Transmit each MP3 file's path and file name. These are often named after the track, CD, and artist.

Match the incoming textual data to the MUZE track list data base using the multi-step search algorithm. This algorithm is fairly accurate at identifying the appropriate artist—a very important key to the operation of the system. It is also accurate at identifying the CD and track, but less so.

Display the appropriate information from the Muze database (and elsewhere) when the artist and CD are known.

The basic music identification process flow must take into consideration many situations while attempting to identify CDs. It is acknowledged that the identification may not always be perfect. The following is a description of a music identification process flow for identifying CDs files according to an embodiment of the present invention. Identifying CDs.

Compute two TOC hash codes including the Microsoft hash code and the open-source "XCMD" hash-code (the one used by CDDB version 1) from the CD's TOC. The present invention uses proprietary technology allowing it to do this without interfering with the CD player operation.

Retrieving information from CDDB version 1 based on the hash codes. This is an optional step, that may be substituted with other retrievals.

Transmit textual descriptive information if available within the player describing the track (similar to the above). This information may exist within the Microsoft-furnished CDPLAYER.INI file, or may be within some kind of play list within the player. This textual information can come either indirectly from CDDB, or can come from users indexing their own CD products.

Augment the track-list data base we propose to purchase from MUZE with a collection of freely-available TOC data on the internet. The TOC data we have assembled to date includes over 45,000 unique TOC hash codes. The quality of this freely available track list data may vary, but the cross-correlation between Microsoft CD player hash codes and Artist/Title/Track data is sufficient.

Ensure that the top 100 CDs are indexed correctly with the Microsoft hash code in our data base, by doing so manually.

Match the data coming in from the user with the Muze tracklist using purely textual techniques, if possible.

If there is a good match and there is an incoming TOC hash code there is no hash code in our data base, we put the incoming hash code into our data base, associating it with the Title identifier (derived from the MUZENBR).

If there is a good match and the hash code is different from what is stored in the database, we make an assumption of multiple TOC hash codes, and record an alternate hash code.

If the incoming data contains a hash code, but no useable textual data, it is looked up. If it matches something on file, the present invention matches the title being played. If it isn't on file, no match to that music is made. It is also possible for a hash code to match more than one title.

Display appropriate information from the Muze database (and elsewhere) when the artist and CD are known.

CD identification involves various methods. One is the sample data kit from MUZE.COM. Additionally, freely available CD tracklists from around the web (e.g., www.hizen.de/cdplayer/index.html). Muze offers a unique Muze number (MUZENBR) for each unique published CD. CDs which haven't been published (such as those created by independent artists and personal compilations written onto CD-R media) don't have MUZENBRs. Tracklists offer a Microsoft-define hash-code. Any particular published CD will have a single MUZENBR and possibly multiple different hash codes.

CDDB (originally the open-source XCMD project) uses a different hash code. These hash codes are derived from the table of contents of the CD. The CD table of contents consists of information describing the number of music tracks on the CD, the overall length of the music on the CD, and the length of each track (see www.disctron.ics.co.uk for further information). The impact of this method of computing hash codes is that two short CDs—CDs with a small number of tracks on them—are statistically much more likely to have identical tables of contents and therefore identical hash code values than longer CDs. CDs of any length can have this problem of TOC hash-code collision. Usually this TOC hash-code collision isn't due to imperfections in the hash function, but rather identity in the underlying TOCs.

The present invention provides performance benefits, including lookup performance. Assuming that a typical song is three minutes in length, for each 1000 users online, the music ID system will have to handle approximately 5.6 queries a second. Assuming 500,000 users, of which about 15% (75,000) will be active, this will require, if the active members are all listening at the same time, about 500 lookups per second (2 ms of processing per lookup). The system is designed for 1000 lookups per second, to give room for growth. Notice that the music lookup subsystem works from basically static reference data. This means it's possible to provide several parallel servers to perform this task.

Muze provides updated data weekly, and the present invention may add data from other sources. It must be possible to load the updated data into our operational lookup system in a convenient amount of processing wall-clock time (an hour or less), in a way which interrupts the lookup process for no more than a second or two.

These lookup algorithms assume that the taking of input data items and the mapping of each of them to a single particular track, title, and artist from within our predetermined set of tracks, titles, and artists. These algorithms have two closely related phases. The first phase is obtaining and preprocessing reference data (the MUZE tracklist, augmented with data from other sources) to build reference index tables. This phase can be performed in batch each time the reference data is updated. The second phase is taking information from clients and matching it to the reference data base, then ordering the match results by relevance. The heart of such lookup algorithms lies in the structure of the reference tables, and their representation of the reference data set. Incoming reference data has these fields (table and column from MUZE data).

| Table and column | Spelling | Description |
|---|---|---|
| ZTITLE.MUZENBR | | Title identification number (DOT_TITLE) |
| ZTITLE.PERFORMER | Authoritative | Artist name, suitable for display |
| ZTITLE.PERFORMER2 | Authoritative | Artist name (indexed to DOT_ARTIST) |
| ZTITLE.TITLE | Authoritative | Title name |
| ZTITLE.CAT3 | Authoritative | Major Genre |
| ZTITLE.CAT4 | Authoritative | Sub Genre |
| ZSONG.MUZENBR | | DOT_TITLE (join index to ZTITLE table) |
| ZSONG.DISC | | Which disc in a multiple disc set |
| ZSONG.TRK | | Which track on the disc |
| ZSONG.SONG | Authoritative | Song title |

The present invention provides information for CDs we add to the MUZE data base in a form similar to this, with a separate distinguishable set of MUZE numbers. The present invention also has incoming reference data from CDPLAYER.INI files we gather from around the net, and from the machines used, with MusicMatch Jukebox, to index new CDs.

| | | |
|---|---|---|
| hashcode | | Microsoft Hash code for CD |
| artist | Questionable Artist | |
| genre | Accurate | Genre |
| title | Questionable | Title name |
| song | Questionable | One entry for each song. |

The first phase of the search takes this input data and builds reference tables. In one embodiment the form for the reference tables is:

String Table:
    Key: Each distinct authoritative text string (title, song, artist), case folded to lower case, with frequently repeated words (a, the) and all punctuation removed.
    Value: a list of (DOT_ARTIST, DOT_TITLE, DOT_TRACK) triples, one entry for each item the key appears in.

Word-Triple Table:
    Key: Each set of consecutive three words from the string table.
    Value: a list of (DOT_ARTIST, DOT TITLE, DOT_TRACK) triples, one entry for each item the key appears in.

Word Table:
    Key: Each individual word from the string table.
    Value: a list of (DOT_ARTIST, DOT TITLE, DOT_TRACK) triples, one entry for each item the key appears in.

Metaphone-Triple Table:
    Key: Metaphone keys for each set of consecutive three words from the string table.
    Value: a list of (DOT_ARTIST, DOT_TITLE, DOT_TRACK) triples, one entry for each item the key appears in.

Metaphone Word Table:
    Key: Metaphone keys for individual word from the string table.
    Value: a list of (DOT_ARTIST, DOT_TITLE, DOT TRACK) triples, one entry for each item the key appears in.

Phase 2 of the lookup algorithm works as follows. In Step 1, for each text string in the input data, look for matches in the string table. Retrieve the list of DOT_ARTIST, DOT_TITLE, DOT_TRACK triples, and assign each item in the retrieved list a relatively high weight. The weight should be a constant times the number of words matched in the string. Step 2, for each triplet of words in each distinct string in the input data, look for matches in the string table. Again, retrieve the list of DOT_ARTIST, DOT_TITLE, DOT_TRACK triples, and assign each item in the retrieved list a lower weight. Step 3, for each word, look for matches in the word table. Assign a modest weight to each word. Step 4, for each triplet of words (as in step 2), compute the metaphone keys and match to the metaphone-triple table. Assign a small weight to each matched item. Step 5, for each individual word, compute the metaphone key and match it to the metaphone word table. Assign a very small weight to each matched item. Step 6, order the matched items by total weight matched. If looking for artist, order the artists. If looking for title, order the titles, and if you're looking for track, order the tracks. The highest weight wins. Note that it's very important to do the ordering depending on what you're looking for. Step 7, (optional) if two or more different items have a tie for top weight, get help from the user in disambiguating the results.

When constructing word triples, we include placeholders at the beginning and end of phrases (indicated by zzz in this specification).
"Love in an elevator" turns into:
zzz love in
love in an
in an elevator
an elevator zzz
"Aerosmith" turns into:
zzz aerosmith zzz
"The Boston Symphony Orchestra" turns into, after stripping the common word:
zzz boston symphony
boston symphony orchestra
symphony orchestra zzz
The following is an example CDPLAYER.INI entry:
[1081d72]
EntryType=1
artist=Jimmie's Chicken Shack
title=Bring Your Own Stereo
genre=rock
numtracks=13
0=Spiraling
1=Lazy Boy Dash
2=Do Right
3=String Of Pearls
4=Ooh
5=Let's Get Flat
6=Trash
7=Fill In The Blank
8=Face It
9=Silence Again
10=Pure
11 Waiting
12=30 Days Each major record label currently spends as much as $100 million yearly on radio promotion and marketing. There are over 300 new songs being promoted to radio stations each week, but only 10% of these will ever see significant airtime. Thus a considerable amount of a record label's promotional budget is wasted on songs that will not be heard by listeners. Meanwhile, radio stations currently do some testing in order to figure which songs will perform best, but most of this testing is conducted via telephone outcall—by placing survey calls to fans.

DotClick tests individual songs over the Internet before their release, via alliances with radio station Web sites. This will dramatically improve record labels' efficiency in determining song-release strategies, and will improve the information radio station programmers use to determine what their listeners most want to hear. Individual radio station Web sites (collectively, the "Radio Station Group") will distribute Dot-Click to their member bases, establishing an expanding network of users, many of whom are ready to listen to pre-release songs and provide feedback.

The benefits of testing with DotClick are clear: the Dot-Click technology, which uses both passively gathered and actively provided user preferences from a large population of users allows highly precise control over targeting. Because the DotClick service can control the testing audience via our powerful targeting technology, a record label can be sure the testers are fans of a certain artist or a certain music genre. DotClick's reporting mechanism is built-in and on-demand, so record labels receive timely, sortable reports that indicate how well a song performs before labels have to sink significant promotional dollars into that song.

The concert touring industry is a multi-billion-dollar-per-year business. Concert promoters spend up to $75,000 per concert, advertising on local radio, print and television for shows in amphitheatres, large arenas and stadiums. A single such ad typically costs $500 to $1,000, and also often requires a free ticket giveaway. Therefore large promoters like SFX and smaller promoters such as Universal Concerts, House Of Blues Concerts, Hard Rock Chains, Golden Voice and JAM are all accustomed to spending large amounts of money, using their promotional dollars on marketing channels that are off-line, and aren't nearly as targeted as DotClick's service.

DotClick's powerful tools allow concert promoters to identify fans in 460 different Designated Marketing Areas (DMAs) across the country, and reach them with concert information and enticements to purchase tickets. On an event-by-event and market-by-market basis, DotClick will deliver information and one-click-shopping for concert tickets to DotClick users who, based upon their listening profiles, would be interested in attending a given event/concert. This is a powerful concept: as a DotClick member plays an artist's music, they are told about a concert coming to their area. It's a focused and Efficient way to fill concert seats.

The Process. The Tour Marketing & Promotion program is sold to a promoter by DotClick (or by a DotClick-designated consultant) for $500 per event, quite a reasonable amount considering how much promoters currently pay for a single radio, print or TV spot. That promoter creates Alerts, along with links to Web sites where tickets to the event may be purchased, and then targets these Alerts using DotClick's behind-the-scenes geography and preferred-genre targeting mechanism. DotClick members receive these Alerts instantly when they've indicated that they're interested in the artist(s) in question, or, even more powerfully, the moment they play music by that artist(s).

The Radio Research & Testing program is sold to a record label by the Radio Station Group (or by a designated consultant). In concert with the Radio Station Group, DotClick arranges for the hosting of songs or song clips to be tested. Over the course of a one-week period, DotClick sends an Alert to the appropriate Digital Music Network members (i.e., those members that are fans of artists or music genres requested by the record label); this Alert contains a hyperlink to one or more of the songs or song clips. After listening to the songs, members are asked to "Play It or Slay It," thereby contributing to ratings data DotClick collects.

Data is compiled into a report with full demographic breakdown; this report is available online, on-demand. The business of promoting new releases is extremely expensive. The cost to a record label of retail promotion programs can range from $25,000 for an end cap display at a national retailer to over $50,000 for an artist wall. Smaller programs include hundreds of dollars for a shelf marker and a few thousand dollars for listening stations. Considering the fact that there are at least 1,100 new records debuting at retail in any given month, record labels must spend a huge amount of money to get any attention for their releases.

In conjunction with large music retailers, DotClick will provide a targeted, lower cost alternative for record labels to promote their recorded music. Individual retail chains will distribute DotClick via their Web sites, establishing a network of their users who can be predicted to be especially receptive to receiving promotional offers from record labels to buy particular types music online. Because DotClick's system gathers detail on members' listening preferences due to our combination of gathering preferences both passively and actively, the DotClick service is uniquely capable of identifying interesting members when a newly released music product or music-related product will appeal to them.

The Retail Marketing & Promotion program is sold to record labels by an individual retailer's retail marketing and sales department. (Record labels may choose to run pre-release and/or post-release programs, depending on their needs.) Each retailer's online division subsequently coordinates the implementation of the program, with V.I.P. customer support from DotClick. The retailer's online division creates Alerts for that retailer's DotClick member base; these Alerts contain information about new releases, direct links to purchase that music from that retailer's Web site, and (optionally) links to streaming audio and music video clips.

While DotClick establishes its initial member base, some key Charter Affiliated Partners do not have to "pay for play" on the Digital Music Network. In other words, Charter Partners distribute a co-branded DotClick, the ability to send targeted Alerts and emails, and the ability to view demographic reports about select members on the Digital Music Network. After DotClick's first year, however, this will change. Once DotClick's member base is large enough to warrant a change, new Affiliates will pay annual subscriptions to participate in the Digital Music Network.

For $5,000 per year per artist, an artist, label, management company and any other potential Affiliate receives unlimited access to DotClick's basic Affiliate services: co-branded download, Alerts, emails and reports. Emerging-Artist Affiliate Subscriptions are also available at a cost of $1,000 per year. Emerging-Artist Subscriptions offer the same services as established-artist services but are limited to artists who do not have any gold- or platinum-selling records.

While this invention has been particularly shown and described with references to preferred embodiments thereof, it will be understood by those skilled in the art that various changes in form and details may be made therein without departing from the scope of the invention encompassed by the appended claims. For example a "piece of music" is meant to encompass any recorded media, including audio, video and multimedia (e.g., a single, or multi-media recording on CD, a video recording on DVD, etc.).

What is claimed is:

1. A method comprising:
    gathering user preferences from a plurality of user devices, wherein the gathering the user preferences includes receiving a message from one of the user devices playing a media recording track, and wherein the message indicates user interest in an artist associated with the media recording track;
    building a user community of the user devices that indicated interest in a plurality of artists using the user preferences;
    receiving information regarding an upcoming concert featuring a specific artist;
    identifying, responsive to receiving the information regarding the upcoming concert, at least one respective user device of the user devices in the user community currently playing a media recording track associated with the specific artist;
    sending a message associated with the upcoming concert to the at least one respective user device; and
    building a user preference database through receiving user music preference information from a downloaded computer plug-in or a response to an information solicitation activity.

2. The method of claim 1, wherein the sending the message further comprises sending information in the message to allow a purchase of a ticket for the concert.

3. The method of claim 1, wherein the identifying further comprises using a relationship between a geographic location of the concert and a designated marketing area associated with each respective user device in the plurality of user devices.

4. The method of claim 1, wherein the information solicitation activity comprises analyzing surveys, requesting rating of music or artists, and requesting feedback on new music or artists.

5. The method of claim 1, further comprising:
    building the user community by transferring information from the user preference database into an automated collaborative filtering engine.

6. A non-transitory computer-readable medium having instructions stored thereon, the instructions comprising:
    instructions to gather user preferences from a plurality of user devices, wherein the gathering the user preferences includes receiving a message from one of the user devices playing a media recording track, and wherein the message indicates user interest in an artist associated with the media recording track;
    instructions to build a user community of the user devices that indicated interest in a plurality of artists using the user preferences;
    instructions to receive information regarding an upcoming concert featuring a specific artist;
    instructions to identify, responsive to receiving the information regarding the upcoming concert, at least one respective user device in the user community currently playing a media recording track associated with the specific artist;
    instructions to send a message regarding the upcoming concert to the at least one respective user device; and
    instructions to build a user preference database through receiving user music preference information from a downloaded computer plug-in or a response to an information solicitation activity.

7. The computer-readable medium of claim 6, wherein the instructions to send the message comprise instructions to send information in the message allowing a purchase of a ticket for the concert.

8. The computer-readable medium of claim 6, wherein the instructions to identify comprise instructions to use a relationship between a geographic location of the concert and a designated marketing area associated with each respective user device in the plurality of user devices.

9. The computer-readable medium of claim 6, wherein the information solicitation activity comprises analyzing surveys, requesting rating of music or artists, and requesting feedback on new music or artists.

10. The computer-readable medium of claim 6, further comprising:
instructions to build the user community by transferring information from the user preference database into an automated collaborative filtering engine.

11. An apparatus comprising:
a processor;
means for gathering user preferences from a plurality of user devices, wherein the gathering the user preferences includes receiving a message from one of the user devices playing a media recording track, and wherein the message indicates user interest in an artist associated with the media recording track;
means for building a user community of the user devices that indicated interest in a plurality of artists using the user preferences;
means for receiving information regarding an upcoming concert featuring a specific artist;
means for identifying, responsive to receiving the information regarding the upcoming concert, at least one respective user device in the user community currently playing a media recording track associated with the specific artist;
means for sending a message regarding the upcoming concert to the at least one respective user device; and
means for building a user preference database through receiving user music preference information from a downloaded computer plug-in or a response to an information solicitation activity.

12. The apparatus of claim 11, further comprising means for sending information allowing a purchase of a ticket for the concert.

13. The apparatus of claim 11, further comprising means for using a relationship between a geographic location of the concert and a designated marketing area associated with the respective user devices in the plurality of user devices.

14. The apparatus of claim 11, wherein the information solicitation activity comprises analyzing surveys, requesting rating of music or artists, and requesting feedback on new music or artists.

15. The apparatus of claim 11, further comprising:
means for building the user community by transferring information from the user preference database into an automated collaborative filtering engine.

16. A system comprising:
a network interface; and
a server coupled to the network interface, wherein the server is configured to:
gather user preferences from a plurality of user devices, wherein the gathering the user preferences includes receiving a message from one of the user devices playing a media recording track, and wherein the message indicates user interest in an artist associated with the media recording track;
build a user community of the user devices that indicated interest in a plurality of artists using the user preferences;
receive information regarding an upcoming concert featuring a specific artist;
identify, responsive to receiving the information regarding the upcoming concert, at least one respective user device in the user community currently playing a media recording track associated with the specific artist;
send a message regarding the upcoming concert to the at least one respective user device; and
build a user preference database through receiving user music preference information from a downloaded computer plug-in or a response to an information solicitation activity.

17. The system of claim 16, wherein the server is further configured to send information in the message allowing a purchase of a ticket for the concert.

18. The system of claim 16, wherein the server is further configured to use a relationship between a geographic location of the concert and a designated marketing area associated with the respective user devices in the plurality of user devices.

19. The system of claim 16, wherein the information solicitation activity comprises analyzing surveys, requesting rating of music or artists, and requesting feedback on new music or artists.

20. The system of claim 16, wherein the server is further configured to:
build the user community by transferring information from the user preference database into an automated collaborative filtering engine.

* * * * *

UNITED STATES PATENT AND TRADEMARK OFFICE
CERTIFICATE OF CORRECTION

| | | |
|---|---|---|
| PATENT NO. | : 8,244,896 B2 | Page 1 of 1 |
| APPLICATION NO. | : 11/892015 | |
| DATED | : August 14, 2012 | |
| INVENTOR(S) | : Woodward et al. | |

It is certified that error appears in the above-identified patent and that said Letters Patent is hereby corrected as shown below:

In Column 2, Line 13, delete "the a" and insert -- the --, therefor.

In Column 7, Line 15, delete "Greateful" and insert -- Grateful --, therefor.

In Column 10, Line 46, delete "DOT TITLE," and insert -- DOT_TITLE, --, therefor.

In Column 10, Line 51, delete "DOT TITLE," and insert -- DOT_TITLE, --, therefor.

In Column 10, Lines 63-64, delete "DOT TRACK)" and insert -- DOT_TRACK) --, therefor.

In Column 11, Line 1, delete "DOT TITLE," and insert -- DOT_TITLE, --, therefor.

Signed and Sealed this
Fifteenth Day of January, 2013

David J. Kappos
*Director of the United States Patent and Trademark Office*